United States Patent
Tempest, Jr.

(10) Patent No.: US 6,824,695 B2
(45) Date of Patent: Nov. 30, 2004

(54) SYSTEM AND METHOD FOR WATER PURIFICATION

(76) Inventor: Gerard F. Tempest, Jr., 101 W. Markham Ave., Durham, NC (US) 27701

( * ) Notice: Subject to any disclaimer, the term of this patent is extended or adjusted under 35 U.S.C. 154(b) by 7 days.

(21) Appl. No.: 10/377,241

(22) Filed: Feb. 28, 2003

(65) Prior Publication Data
US 2004/0168989 A1 Sep. 2, 2004

(51) Int. Cl.[7] .................................................. C02F 1/78
(52) U.S. Cl. .................. 210/760; 210/620; 210/739; 210/748; 210/85; 210/143; 210/198.1; 210/203; 210/263; 210/314; 210/322; 422/186.07
(58) Field of Search ............................... 210/620, 739, 210/748, 760, 764, 767, 85, 143, 192, 198.1, 200, 203, 263, 314, 322; 422/186.07

(56) References Cited

U.S. PATENT DOCUMENTS

| | | | |
|---|---|---|---|
| 4,002,567 A | 1/1977 | Konno et al. | |
| 4,080,287 A | 3/1978 | Conway et al. | |
| 4,391,712 A | 7/1983 | Tyler et al. | |
| 4,800,024 A | 1/1989 | Elfline | |
| 5,302,288 A | 4/1994 | Meidl et al. | |
| 5,336,413 A | 8/1994 | van Staveren | |
| 5,518,624 A | 5/1996 | Filson et al. | |
| 5,585,003 A | 12/1996 | Van Newenhizen | |
| 5,585,531 A | 12/1996 | Barker et al. | |
| 5,645,727 A | 7/1997 | Bhave et al. | |
| 5,683,576 A | 11/1997 | Olsen | |
| 5,824,243 A * | 10/1998 | Contreras | 261/36.1 |
| 5,882,590 A | 3/1999 | Stewart et al. | |
| 6,103,125 A | 8/2000 | Kuepper | |
| 6,203,701 B1 | 3/2001 | Pressley et al. | |
| 6,214,574 B1 | 4/2001 | Kopf | |
| 6,312,588 B1 * | 11/2001 | Conrad et al. | 210/85 |
| 6,395,522 B1 | 5/2002 | DeFilippi et al. | |
| 6,419,831 B2 * | 7/2002 | Wang | 210/668 |

* cited by examiner

Primary Examiner—Betsy Morrison Hoey

(57) ABSTRACT

A self-contained, portable water purification system, including (a) an ozone supply, (b) an ozone contact chamber mixing a contaminated or potentially contaminated water stream with ozone generated by such ozone supply, (c) an ozone destruction unit for destructing ozone contained in the water stream and converting said water stream into an oxygen-rich and ozone-depleted water stream, and (d) a downstream biologically active carbon filter, for receiving such oxygen-rich and ozone-depleted water stream and biologically destructing at least a portion of contaminants contained therein.

81 Claims, 3 Drawing Sheets

US 6,824,695 B2

SYSTEM AND METHOD FOR WATER PURIFICATION

FIELD OF THE INVENTION

The present invention relates to water purification systems and methods, particularly to water purification systems and methods of using the same for producing water that is free of chemical, biological, and radiological (CBR) contaminants and suitable for human and/or animal consumption.

BACKGROUND OF THE RELATED ART

Water covers more than two-thirds of the earth's surface. Nevertheless, there are many areas where water is scarce or where water, if available, is not potable and not suitable for human and/or animal consumption.

Various water treatment systems and methods have been developed for purifying unpotable water and rendering it suitable for human and/or animal consumption. An illustrative water purification system of such type is described in U.S. Pat. No. 5,741,416 issued Apr. 21, 1998 to Gerard F. Tempest, Jr. for "WATER PURIFICATION SYSTEM HAVING PLURAL PAIRS OF FILTERS AND AN OZONE CONTACT CHAMBER", disclosing a water purification system that is effective to oxidize organic contaminants and to destroy most of the bacteria, viruses, and other microbes in such water stream.

Recently, after the events of Sep. 11, 2001, the possibility of terrorist attacks on the U.S. municipal water supplies or water distribution systems has attracted great public attention. By introducing chemical warfare agents (CWA), biological warfare agents (BWA), or radiological contaminants (RC) into such water sources, terrorists can inflict catastrophic injuries and losses of life within a short period of time.

Another concern relating to the viability of water sources is the possibility of pollution of water from industrial accidents and natural events such as tornados, hurricanes, earthquakes, and other severe weather and geologic events that may damage industrial facilities and distribution infrastructure, and result in pollution of water intended for human or animal use, or for agricultural and industrial operations. Such pollution may take many forms, and may likewise involve chemical contamination, biological contamination, and/or radiological contamination.

There is a continuing need for robust water purification systems for treatment of water that is or may be contaminated with chemical, biological and/or radiological contaminants.

Since contamination or threats of contamination of water are frequently of a highly local character, there is a correlative need for a fixed or portable water purification system that can be rapidly and easily deployed at a location of actual or potential contamination, particularly a system of such type that can effectively remove CWA, BWA, and/or RC contaminants (hereinafter "CBR" contaminants) from an actually or potentially contaminated water supply and produce treated water that is suitable for human consumption.

Since the risks attendant to terrorist attacks are particularly acute in relation to water supplies, there is also a compelling need for a water purification system having an anti-tamper character, to minimize the threat of willful disabling or destruction of such system.

Water purification systems of the foregoing type are needed that enable cleaning and servicing of components of the system without interruption of water treatment, and that are capable of evaluating the quality of treated water at a particular location in the treatment process and either diverting the water to drain or, optionally, recirculating and re-treating water that does not satisfy treated water quality standards.

SUMMARY OF THE INVENTION

The present invention in one aspect relates to a water purification system, preferably of a self-contained and portable character, for treatment of a water stream to remove chemical, biological, and/or radiological contaminants therefrom, comprising:

(a) an ozonation unit for ozone treatment of the water stream, comprising:
  (i) an ozone contact chamber arranged to receive such water stream, mix such water stream with ozone, and discharge an ozonated water stream therefrom; and
  (ii) an ozone supply arranged for variable output of ozone and coupled in ozone-supplying relationship to such ozone contact chamber;

(b) an ozone destruction unit downstream of such ozone contact chamber, for removing residual ozone from the ozonated water stream and converting such ozonated water stream into an oxygen-rich and ozone-depleted water stream; and (c) at least one activated carbon adsorbent unit arranged to receive the oxygen-rich and ozone-depleted water stream from the ozone destruction unit, contact such water stream with activated carbon adsorbent, and discharge a treated water stream.

The present invention in another aspect relates to a method for treating a water stream to remove chemical, biological, and/or radiological contaminants, comprising the steps of:

(a) providing an ozonation unit comprising (i) an ozone contact chamber arranged to receive the water stream, mix such water stream with ozone, and discharge an ozonated water stream therefrom; and (ii) an ozone supply arranged for variable output of ozone and coupled in ozone-supplying relationship to the ozone contact chamber;

(b) flowing such water stream into the ozone contact chamber, mixing such water stream with ozone therein, and discharging the ozonated water stream therefrom;

(c) subsequently, passing the ozonated water stream through an ozone destruction unit to remove residual ozone contained therein and to convert such ozonated water stream into an oxygen-rich and ozone-depleted water stream;

(d) subsequently, passing the oxygen-rich and ozone-depleted water stream through at least one activated carbon adsorbent unit to contact such water stream with activated carbon adsorbent; and (e) discharging a treated water stream.

The present invention in a further aspect relates to a self-contained, portable water purification system, comprising:

(a) an ozonation unit for ozone treatment of the water stream, comprising:
  (i) an ozone contact chamber arranged to receive such water stream, mix such water stream with ozone, and discharge a ozonated water stream therefrom; and
  (ii) an ozone supply arranged for variable output of ozone and coupled in ozone-supplying relationship to the ozone contact chamber;

(b) an ozone destruction unit downstream of such ozone contact chamber, for removing residual ozone from the ozonated water stream and converting the ozonated water stream into an oxygen-rich and ozone-depleted water stream, wherein the ozone destruction unit comprises at least one broad-spectrum radiation source for providing UV radiation having wavelength ranging from about 170 nm to about 300 nm; and (c) a monitoring unit arranged to continuously monitor oxidation-reduction potential of the oxygen-rich and ozone-depleted water stream and to correlatively actuate the ozone supply to produce an output of ozone for maintaining the oxidation-reduction potential of such water stream at a predetermined level.

The present invention in a still further aspect relates to a method for purifying a water stream, comprising the steps of:

(a) providing an ozonation unit comprising (i) an ozone contact chamber arranged to receive the water stream, mix the water stream with ozone, and discharge an ozonated water stream therefrom; and (ii) an ozone supply arranged for variable output of ozone and coupled in ozone-supplying relationship to the ozone contact chamber;

(b) flowing such water stream into the ozone contact chamber, mixing said water stream with ozone therein, and discharging an ozonated water stream therefrom;

(c) subsequently, passing the ozonated water stream through an ozone destruction unit, so as to remove residual ozone contained therein and to convert such ozonated water stream into an oxygen-rich and ozone-depleted water stream, wherein the ozone destruction unit comprises at least one broad-spectrum radiation source for providing UV radiation having wavelength ranging from about 170 nm to about 300 nm; and (d) discharging the treated water stream.

The present invention in a still further aspect relates to a system for treatment of water to remove chemical, biological, and/or radiological contaminants therefrom, such system comprising a unitary sealed housing arranged for connection to an external water source and having an anti-tamper character, wherein the unitary sealed housing has disposed therein one or more water treatment units arranged to treat water from the external water source to produce a treated water stream depleted of chemical, biological, and/or radiological contaminants, and wherein such unitary sealed housing comprises an outlet for discharging said treated water stream therefrom.

Additional aspects, features and embodiments of the invention will be more fully apparent from the ensuing disclosure and appended claims.

DETAILED DESCRIPTION AND PREFERRED EMBODIMENTS THEREOF

Figure 1:
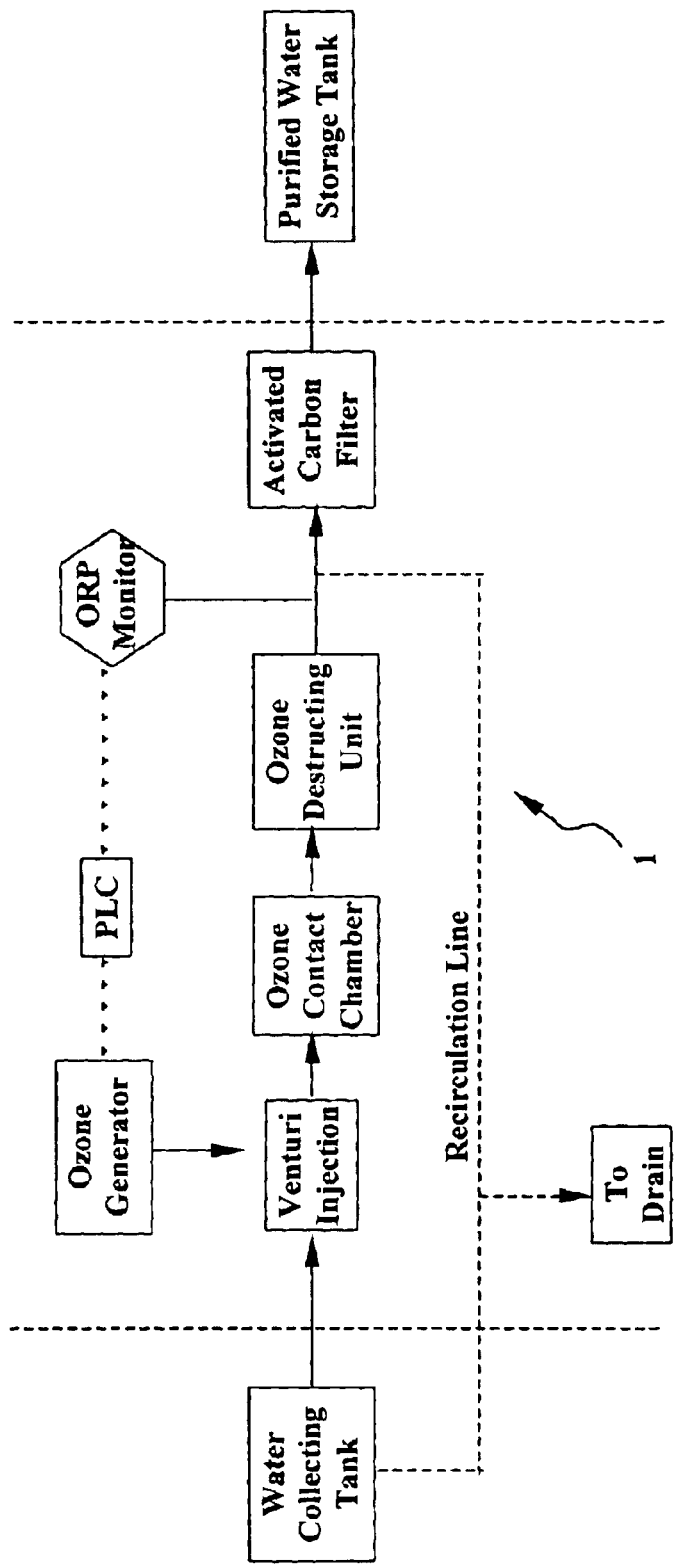
FIG. 1 is a diagram showing various components of a water purification system according to one embodiment of the present invention.

The disclosure of U.S. Pat. No. 5,741,416, issued to Tempest on Apr. 21, 1998 for "WATER PURIFICATION SYSTEM HAVING PLURAL PAIRS OF FILTERS AND AN OZONE CONTACT CHAMBER," is incorporated herein by reference in its entirety for all purposes.

The present invention provides a robust, fixed or portable, and self-contained water purification system that comprises an ozonation unit for ozone treatment of a contaminated or potentially contaminated water stream, an ozone destruction unit for converting the residual ozone in the ozonated water stream into oxygen, and an activated carbon adsorbent unit (preferably a biologically active carbon filter) for further purifying such water stream by contacting the same with activated carbon adsorbent.

By placing the ozone destruction unit between such ozonation unit and such activated carbon adsorbent unit, an oxygen-rich and ozone-depleted water stream is formed, in which aerobic microorganisms flourish. Such aerobic microorganisms function not only to suppress the growth of harmful anaerobic microorganisms in the water stream, but also to destruct various organic particulates or ozonation by-products contained in such water stream. By passing such oxygen-rich and ozone-depleted water stream containing such aerobic microorganisms subsequently through the activated carbon adsorbent unit, the present invention achieves an unexpected and surprising advantage of effectively preventing particulate build-up or anaerobic microbial growth on the activated carbon adsorbent unit and significantly extending the life of such adsorbent unit.

Preferably, the activated carbon adsorbent unit comprises a biologically active carbon filter having biologically active aerobic microorganisms supported thereon, so that the oxygen contained in such oxygen-rich and ozone-depleted water stream activates such aerobic microorganisms to biologically destroy organic particulates and ozonation by-products contained in such water stream. In this preferred embodiment, the ozone destruction unit performs the dual function of removing the residual ozone and aerating the water stream before passing such through the biologically active carbon filter, so that no additional aeration equipment is necessary for optimizing the performance of the biologically active carbon filter.

A granular activated carbon filter can further be placed downstream of such biologically active carbon filter, so as to remove any residual particulates from the water stream.

The ozonation unit as described hereinabove can be configured in any suitable manner, and in one embodiment comprises an ozone supply and an ozone contact chamber. The ozone supply is coupled with such ozone contact chamber and supplies ozone thereto, while a water stream to be treated is flowed into such ozone contact chamber from an external water source, mixed with ozone therein, and discharged from such ozone contact chamber as an ozonated water stream.

The ozone supply is either a fixed or a portable ozone generator, and more preferably a corona discharge ozone generator, so that ozone can be generated on site, and so that the water purification system is independent of any external ozone source and is therefore easily transportable. An air compressor and a desiccant device are preferably used for supplying compressed dry air to such portable ozone generator. The ozone generator converts oxygen into ozone and supplies the generated ozone to the ozone contact chamber, e.g., for injection into the water stream through a venturi injection tube that is coupled with the ozone contact chamber.

The ozone contact chamber preferably has a gas/liquid mixer therein, so that the water stream to be treated is mixed with the ozone so as to dissolve a sufficient amount of ozone in the water stream. The water/ozone mixture remains in such ozone contact chamber for any suitable time, during which the dissolved ozone functions to oxidize various organic and biological contaminants in such water stream. The ozonated water stream then is discharged from the ozone contact chamber.

The contact time can be kept constant or substantially constant, by providing a constant water flow through the ozone contact chamber.

A preferred embodiment of the present invention provides a monitoring unit downstream of the ozone contact chamber or the ozone destruction unit, so as to continuously monitor the oxidation-reduction potential of the ozone-treated water stream. Such monitoring unit is communicatively connected to a programmable logic controller (PLC), which in turn is connected to the ozone supply and functions to correlatively actuate the ozone supply to produce an ozone output that is sufficient to maintain the oxidation-reduction potential of the ozone-treated water stream at a predetermined value.

The oxidation-reduction potential (ORP) of the ozone-treated water stream correlates to the degree of oxidation of the organic and biological contaminants accomplished by ozone, and it is preferable to maintain the ORP above a predetermined value in a range of from about 600 to about 1000 millivolts, more preferably from about 650 to about 950 millivolts. A minimum of 650 millivolts has been set by the World Health Organization as an acceptable indicator of disinfection efficacy.

Thus, the monitoring unit of the present invention continuously monitors the ORP of the ozone-treated water stream and produces a correlative output signal to the PLC, which automatically adjusts the ozone output from the ozone supply, for purpose of modulating the ozone concentration in the water stream according to the ORP value measured, so as to maintain the ORP value of the ozone-treated water stream above the predetermined value, without changing the predetermined ozone contact time, which can be any suitable duration.

Further, the PLC can be connected to a diverter valve on a recirculation line, so that when the ORP of the ozone-treated water stream is below the predetermined value, the PLC opens the diverter value and effectuates recirculation of the ozone-treated water stream back to the ozone contact chamber through the recirculation line, so such water stream is subjected to further ozone treatment, or discharge the water to waste.

By monitoring the ORP of the ozone-treated water stream, automatically adjusting the ozone output from the ozone supply accordingly, and/or recirculating insufficiently oxidized water back to a point prior to ozone injection or discharging such water to waste, the present invention achieves automatic quality assurance for the treated water stream.

The ozonated water stream from the ozone contact chamber is subsequently flowed into the ozone destruction unit for removing residual ozone therefrom and for converting such ozonated water stream into an oxygen-rich and ozone-depleted water stream.

Such ozone destruction unit can comprise any suitable means for decomposing the residual ozone into oxygen gas, which include, without limitation, catalyst-based ozone decomposers, radiation-based ozone decomposers, etc.

Preferably, the ozone destruction unit is radiation-based, comprising one or more radiation sources for irradiating the ozonated water stream with radiation energy that is effective for destructing and decomposing the residual ozone into oxygen. More preferably, such one or more radiation sources produce radiation energy that is within the UV spectrum (i.e., having wavelength in a range of from about 4 nm to about 380 nm). Most preferably, such radiation sources have a sufficiently broad radiation spectrum and are capable of providing UV radiation having wavelength ranging from about 170 nm to about 300 nm. Various commercially available UV sources are suitable for practicing the present invention, among which low-pressure mercury discharge UV lamps are preferred.

UV light characterized by a wavelength in a range of from about 250 nm to about 260 nm, preferably of about 254±2 nm, is particularly effectively in breaking down ozone into oxygen, and such UV light is preferably produced at an intensity that is sufficient to break down substantially all the residual ozone, either dissolved or undissolved, in such water stream. More preferably, such UV light is produced at an intensity of from about 80,000 to about 500,000 microwatt seconds per $cm^2$, and most preferably of about 90,000 microwatt seconds per $cm^2$ to about 450,000 microwatt seconds per $cm^2$.

Further, UV light in the wavelength range of from about 180 nm to about 190 nm, preferably 185±2 nm, is effective in breaking down chlorine, chloramines, and various organic species contained in such water stream. The 185±2 nm UV light is capable of producing $OH^-$ radicals that can break down organic contaminants in a manner that ozone cannot.

Therefore, by employing at least one broad-spectrum radiation source that provides UV radiation having wavelength ranging from about 170 nm to about 300 nm, which covers both the 254 nm wavelength optimal for ozone destruction and the 185 nm wavelength optimal for chlorine, chloramines, and organic contaminants destruction, the ozone destruction unit of the present invention achieves four different functions at the same time: (1) removing the residual ozone, (2) aerating the water stream; (3) removing chlorine, chloramines and reducing the total organic carbon (TOC) content of the water, and (4) further breaking down organic contaminants that have survived the ozone-treatment. Such radiation source can be mounted onto an interior surface of a radiation chamber or a radiation tube, through which the ozonated water steam is passed, so that the UV light is irradiated onto the water stream.

Alternatively, the ozone destruction unit of the present invention can comprise a first UV lamp that emits UV light in a wavelength range of 250–260 nm, and a second UV lamp that emits UV light in a wavelength range of 180–190 nm.

The present invention, by employing (1) ozone for oxidation treatment of the water stream, (2) UV radiation for removing residual ozone and disinfecting such water stream, and (3) activated carbon adsorbent unit for removing particulate contaminants in such water stream, functions to produce purified water suitable for human or animal consumption, or for agriculture and industrial applications, without introducing any chemical disinfectant into the stream. Therefore, the water purification method and apparatus of the present invention are environmentally friendly.

FIG. 1 shows a water purification system 1, according to a first embodiment of the present invention, which comprises an ozone generator, a venturi injector, an ozone contact chamber, an ozone destructing unit, an activated carbon filter, and optionally an ORP monitor connected to a PLC that modulates the ozone output from the ozone generator, as described hereinabove.

The water purification system of the present invention can further comprise a particulate filtration module upstream of the ozonation unit, for pre-treating the water stream and removing at least a portion of particulate contaminants therefrom.

Such particulate filtration module functions to reduce the burden of the downstream ozonation unit, so that less ozone is required for sufficient oxidation of the contaminants in the water stream, thereby enhancing the energy consumption of the overall system and the operation efficiency thereof.

The particulate filtration module preferably comprises one or more filtration elements selected from the group consisting of (a) hollow fiber membrane separators, and (b) ultrafiltration elements. Multiple hollow fiber membrane separators and ultrafiltration elements can be employed in an alternating manner, so as to maximize the particulate removal capacity of such particular filtration module.

The filtration elements preferably comprise tangential flow or cross-flow filtration devices, as well known in the art, so as to prevent blinding of the filtration surface.

In order to reduce the vulnerability of such particulate filtration module to failure of individual filters, and to reduce the system downtime during cleaning and maintenance of individual filters, such particulate filtration module comprises multiple parallely arranged filtration elements, each of which provides an independent filtration path for the water stream.

A preliminary filter upstream of such particulate filtration module is preferably employed, which can for example have a porosity in a range of from about 10 microns to about 20 microns, so as to filter out large particles (such as solid particles, spores, and bacteria) from the water stream and to extend the life of the filters used in the downstream particulate filtration module.

In a preferred embodiment of the present invention, an aeration module is provided upstream of such particulate filtration module, to aerate the water stream with an oxygen-containing gas and render the water stream oxygen-rich. Aerobic microorganisms flourish in such oxygen-rich water stream, and function not only to suppress the growth of harmful anaerobic microorganisms in the water stream, but also to destroy various organic particulates contained in such water stream. By passing such oxygen-rich water stream containing aerobic microorganisms subsequently through the filters of the particulate filtration module, the present invention effectively prevents particulate build-up or anaerobic microbial growth on the filtration surface of such filters, thereby significantly extending the life thereof.

Figure 2:
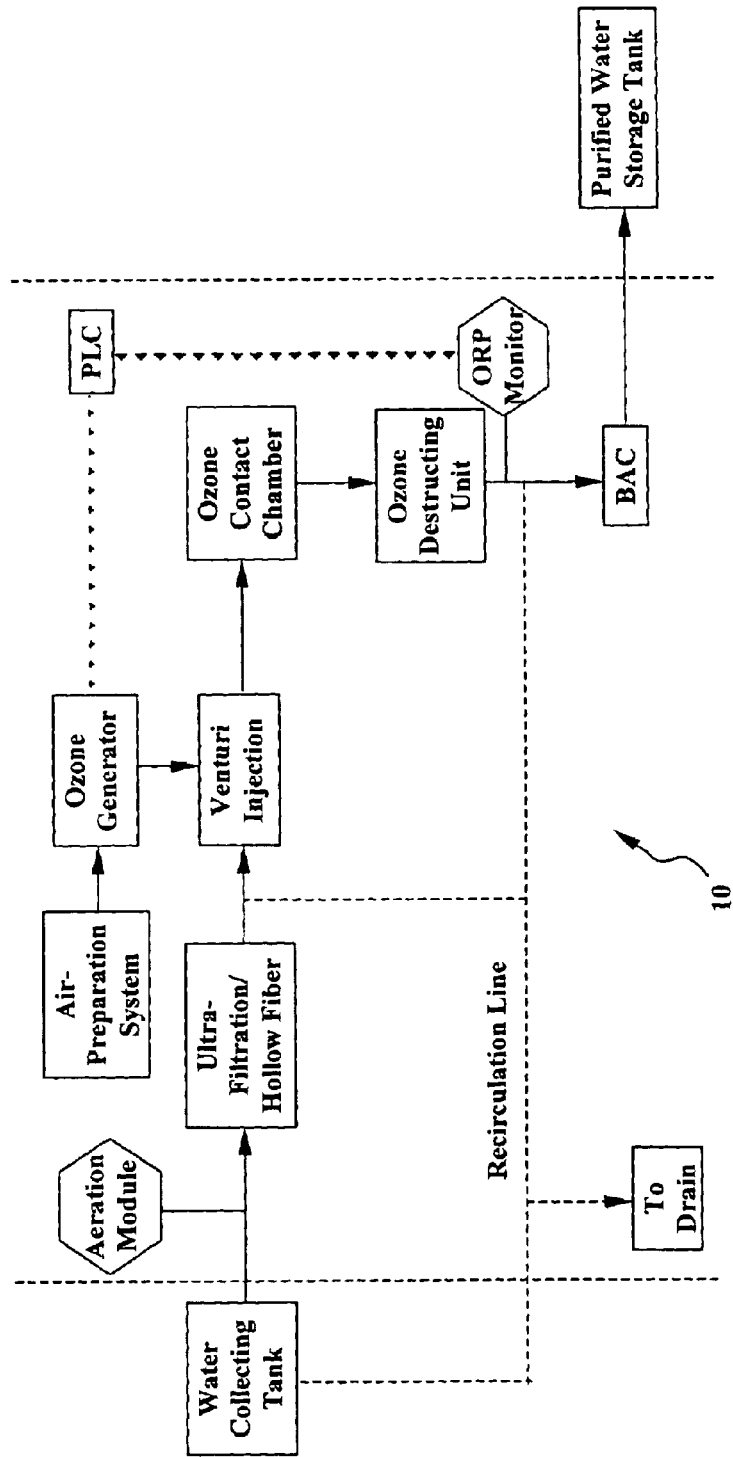
FIG. 2 is a diagram showing various components of a water purification system according to another embodiment of the present invention.

FIG. 2 shows a water purification system 10, according to a second embodiment of the present invention, which comprises an aeration module, a particulate filtration module comprising ultrafiltration elements and/or hollow fiber membrane separators, an ozone generator for injecting ozone into the water stream via a venturi injector, an ozone contact chamber, an ozone destructing unit, a biologically activated carbon (BAC) filter, and optionally an ORP monitor connected to a PLC that modulates the ozone output from the ozone generator, as described hereinabove. Such system 10 further comprises a recirculating line for recirculating the water back to either the ozone contact chamber or the particulate filtration module for further treatment, in case when the ORP measured by the ORP monitor is below a predetermined value, as described hereinabove.

If the water stream to be treated is contaminated or potentially contaminated with radiological contaminants, it is necessary for the water purification system to be equipped with a radiological contamination removal unit downstream of the activated carbon adsorbent unit.

Such radiological contamination removal unit may comprise either a nanofiltration (NF) module or a reverse osmosis (RO) module for removing radioactive ions from the water stream. RO module has been conventionally used for such purpose and proven to be effective. Nanofiltration is highly effective for removing dissolved radiological agents such as radium and uranium. Moreover, nanofiltration requires less pressure and less energy and water consumption in comparison with RO modules, and it is therefore preferred for radiological contaminants removal.

An ion exchange module can be further employed downstream of an NF or an RO module, as a polishing stage to ensure complete removal of all traces of the radiological contaminants from the water stream.

The radiological contamination removal unit is preferably connected to the activated carbon adsorbent unit via a diverter valve, and a radiological contamination detector is further provided upstream of such radiological contamination removal unit, so that when no radiological contaminants are detected, the water stream is discharged out of the system without being passed through such radiological contamination removal unit, but when radiological contaminants are detected by such detector, an indicative signal is transmitted to a PLC connected therewith, which in turn actuates the diverter valve to divert the water stream from the activated carbon adsorbent unit either to waste, or to such radiological contamination removal unit, for removal of the radiological contaminants from the water stream.

Figure 3:
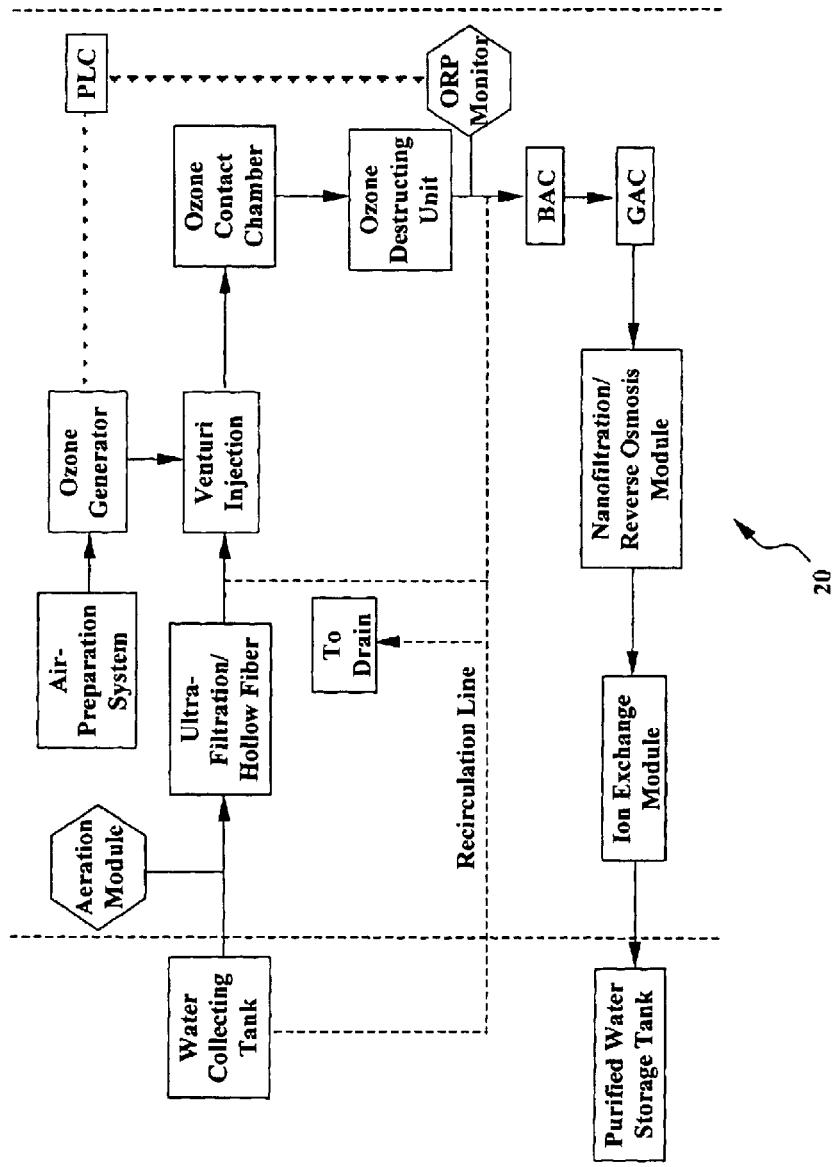
FIG. 3 is a diagram showing various components of a water purification system, according to yet another embodiment of the present invention.

FIG. 3 shows a water purification system 20, according to a third embodiment of the present invention, which comprises an aeration module, a particulate filtration module comprising ultrafiltration elements and/or hollow fiber membrane separators, an ozone generator for injecting ozone into the water stream via a venturi injector, an ozone contact chamber, an ozone destructing unit, a biologically activated carbon (BAC) filter, a granular activated carbon (GAC) filter, a NF/RO module, an ion exchange module, and optionally an ORP monitor connected to a PLC that modulates the ozone output from the ozone generator, as described hereinabove.

The water treatment system of the present invention can further comprise a hydraulic accumulator tank, into which the treated water is flowed, for purpose of maintaining an even pressure in the system and providing a substantially constant water supply to the downstream water consumption facility.

The water treatment system of the present invention can further comprise a water quality monitoring module, which continuously monitors one or more variables (e.g., including but not limited to: chlorine concentration, pH value, conductivity, total organic carbon, dissolved oxygen, chemical oxygen demand, turbidity, and radioactivity) that are indicative of the quality of the water stream to be treated, compares such variables against a baseline value determined by previously observed values of such variables, identifies a significant deviation from such baseline value, and produces an output signal indicative of said deviation. Automatic sensors can be used to make accurate measurements of such variables, and a sampler can be used to collect discrete water samples on a regular basis, which allows the isolation of a sample from the time frame when a deviation occurred. Various analytical procedures can then be carried out upon such sample, so as to identify the contaminants in the water that causes such deviation. This water quality monitoring module can further function to turn on or turn off the water treatment system as needed, and/or to alert authorities that the water quality is not meeting pre-established drinking water quality standards.

The water treatment system of the present invention can be either fixed or portable. It is preferably constructed and arranged for vehicular transport and deployment, so it can be used to provide water supply to disaster sites, governmental and military installations, etc.

In order to prevent failure of the water treatment system as a result of unauthorized tampering by terrorist or other criminal personnel, the water treatment system is preferably disposed in a unitary sealed housing. Such unitary sealed housing may comprise interiorly disposed explosive material, which is detonatable by tampering activity breaching the sealed housing, or such housing and the content therein are otherwise self-destructible (e.g., meltable) when being tampered. Various suitable explosive materials can be used for such purpose, among which C.4 plastic explosive material is preferred.

The system of the present invention is capable of being configured with various components in a parallelly and/or serially redundant manner, so as to raise the system reliability and the overall system performance. It will be further recognized that the system and embodiments described herein may employs functional redundancy in effecting complete removal of CBR contaminants.

While the present invention has been described with reference to specific embodiments thereof, it will be appreciated that numerous variations, modifications, and embodiments are possible, and accordingly, all such variations, modifications, and embodiments are to be construed as being within the spirit and scope of the present invention.

What is claimed is:

1. A water purification system for treatment of a water stream to remove chemical, biological, and/or radiological contaminants therefrom, comprising:
   (a) an ozonation unit for ozone treatment of said water stream, comprising:
      (i) an ozone contact chamber arranged to receive said water stream, mix said water stream with ozone, and discharge an ozonated water stream therefrom; and
      (ii) an ozone supply arranged for variable output of ozone and coupled in ozone-supplying relationship to said ozone contact chamber;
   (b) an ozone destruction unit downstream of said ozone contact chamber, for removing residual ozone from said ozonated water stream and converting said ozonated water stream into an oxygen-rich and ozone-depleted water stream; and
   (c) at least one activated carbon adsorbent unit arranged to receive said oxygen-rich and ozone-depleted water stream from said ozone destruction unit, contact said water stream with activated carbon adsorbent, and discharge a treated water stream.

2. The water purification system of claim 1, wherein said at least one activated carbon adsorbent unit comprises a biologically active carbon filter having biologically active aerobic microorganisms supported thereon, which are activated by oxygen contained in said oxygen-rich and ozone-depleted water stream for biologically destroying at least a portion of the contaminants contained in said water stream.

3. The water purification system of claim 2, further comprising a granular activated carbon filter downstream of said biologically active carbon filter for removing any undestroyed contaminants contained in said water stream.

4. The water purification system of claim 1, further comprising a monitoring unit arranged for continuously monitoring oxidation-reduction potential of said oxygen-rich and ozone-depleted water stream from the ozone destruction unit.

5. The water purification system of claim 4, wherein said monitoring unit comprises an oxidation-reduction potential probe.

6. The water purification system of claim 4, further comprising a programmable logic controller communicatively connected to the monitoring unit and the ozone supply, wherein said programmable logic controller correlatively actuates the ozone supply to produce an output of ozone for maintaining the oxidation-reduction potential of said oxygen-rich and ozone-depleted water stream at a predetermined value.

7. The water purification system of claim 6, wherein said predetermined value is in a range of from about 600 to about 1000 millivolts.

8. The water purification system of claim 6, wherein said predetermined value is in a range of from about 650 to about 950 millivolts.

9. The water purification system of claim 6, wherein said programmable logic controller is further communicatively connected to a recirculation line, so that when the oxidation-reduction potential of the oxygen-rich and ozone-depleted water stream is below said predetermined value, said programmable logic controller effectuates recirculation of such water stream back to the ozone contact chamber through said recirculation line for further oxidation treatment, or discharged to waste therethrough.

10. The water purification system of claim 1, wherein said ozone supply comprises a portable ozone generator.

11. The water purification system of claim 1, wherein said ozone destruction unit comprises one or more radiation sources for irradiating said ozonated water steam with radiation energy effective to destruct residual ozone contained therein.

12. The water purification system of claim 11, wherein said ozone destruction unit comprises a broad-spectrum radiation source for irradiating UV radiation having wavelength ranging from about 170 nm to about 300 nm.

13. The water purification system of claim 12, wherein the UV radiation produced by said broad-spectrum radiation source is characterized by an intensity in a range of from about 80,000 microwatt seconds per $cm^2$ to about 500,000 microwatt seconds per $cm^2$.

14. The water purification system of claim 12, wherein the UV radiation produced by said broad-spectrum radiation source is characterized by an intensity in a range of from about 90,000 microwatt seconds per $cm^2$ to about 450,000 microwatt seconds per $cm^2$.

15. The water purification system of claim 11, wherein said ozone destruction unit comprises a first radiation source that emits UV light in a wavelength range of from about 250 nm to about 260 nm.

16. The water purification system of claim 15, wherein said first radiation source emits UV light in a wavelength range of about 254±2 nm.

17. The water purification system of claim 15, wherein said ozone destruction unit comprises a second radiation source that emits UV light in a wavelength range of from about 180 nm to about 190 nm.

18. The water purification system of claim 17, wherein said second radiation source emits UV light in a wavelength range of about 185±2 nm.

19. The water purification system of claim 1, further comprising a particulate filtration module upstream of said ozone contact chamber, for pre-treating the water stream and removing at least a portion of particulate contaminants therein.

20. The water purification system of claim 19, wherein said particulate filtration module comprises one or more filtration elements selected from the group consisting of: (a) hollow fiber membrane separators, and (b) ultrafiltration elements.

21. The water purification system of claim 19, wherein said particulate filtration module comprises alternatively arranged hollow fiber membrane separators and ultrafiltration elements.

22. The water purification system of claim 19, wherein said particulate filtration module comprises one or more tangential flow filtration elements.

23. The water purification system of claim 19, wherein said particulate filtration module comprises multiple parallely arranged filtration elements.

24. The water purification system of claim 19, further comprising a preliminary filter upstream of said particulate filtration module, wherein said preliminary filter has a porosity in a range of from about 10 microns to about 20 microns.

25. The water purification system of claim 19, further comprising an aeration module upstream of said particulate filtration module, for aerating the water stream with an oxygen-containing gas.

26. The water purification system of claim 25, further comprising flow circuitry arranged to recirculate the oxygen-rich and ozone-depleted water stream from said ozone destruction unit back to said particulate filtration module or to said aeration module.

27. The water purification system of claim 1, further comprising a radiological contamination removal unit arranged to receive the treated water stream from said at least one activated carbon adsorbent unit, remove radiological contaminant therefrom, and discharge a further treated water stream depleted in radiological contaminant.

28. The water purification system of claim 27, wherein said radiological contamination removal unit comprises at least one filtration module selected from the group consisting of: (a) nanofiltration modules, and (b) reverse osmosis modules.

29. The water purification system of claim 28, wherein said radiological contamination removal unit further comprises at least one ion exchange module.

30. The water purification system of claim 27, wherein said radiological contamination removal unit is connected to said at least one activated carbon adsorbent unit via a diverter valve, wherein said system further comprises (a) a radiological contamination detector upstream of said radiological contamination removal unit, and (b) a programmable logic controller communicatively connected to the radiological contamination detector and the diverter valve, so that when no radiological contaminant is detected, the treated water stream is discharged from said at least one activated carbon adsorbent unit out of the system, but when the presence of radiological contaminant is detected, the programmable logic controller actuates the diverter valve to divert the treated water stream from said at least one activated carbon adsorbent unit to waste, or into said radiological contamination removal unit for removal of the radiological contamination.

31. The water purification system of claim 1, further comprising a hydraulic accumulator tank downstream of said at least one activated carbon adsorbent unit, for maintaining a substantially even pressure in said system.

32. The water purification system of claim 1, which in operation involves no chemical addition other than ozone to water therein.

33. The water purification system of claim 1, constructed and arranged for vehicular transport and deployment.

34. The water purification system of claim 1, constructed and arranged as a fixed-structure.

35. The water purification system of claim 1, disposed in a unitary sealed housing having an anti-tamper character.

36. The water purification system of claim 35, wherein said anti-tamper character of said unitary sealed housing is provided by interiorly disposed explosive material that is detonatable by tamper activity breaching said sealed unitary housing.

37. The water purification system of claim 35, wherein said anti-tamper character of said unitary sealed housing is provided by self-destruction of said housing and contents contained therein in case of tampering.

38. A method for treating a water stream to remove chemical, biological, and/or radiological contaminants, comprising the steps of:
  (a) providing an ozonation unit comprising (i) an ozone contact chamber arranged to receive said water stream, mix said water stream with ozone, and discharge an ozonated water stream therefrom; and (ii) an ozone supply arranged for variable output of ozone and coupled in ozone-supplying relationship to said ozone contact chamber;
  (b) flowing said water stream into the ozone contact chamber, mixing said water stream with ozone therein, and discharging the ozonated water stream therefrom;
  (c) subsequently, passing the ozonated water stream through an ozone destruction unit to remove residual ozone contained therein and to convert said ozonated water stream into an oxygen-rich and ozone-depleted water stream;
  (d) subsequently, passing said oxygen-rich and ozone-depleted water stream through at least one activated carbon adsorbent unit to contact said water stream with activated carbon adsorbent; and
  (e) discharging a treated water stream.

39. The method of claim 38, wherein no chemical other than ozone is added into said water stream.

40. A self-contained water purification system, comprising:
  (a) an ozonation unit for ozone treatment of said water stream, comprising:
    (i) an ozone contact chamber arranged to receive said water stream, mix said water stream with ozone, and discharge an ozonated water stream therefrom; and
    (ii) an ozone supply arranged for variable output of ozone and coupled in ozone-supplying relationship to said ozone contact chamber;
  (b) an ozone destruction unit downstream of said ozone contact chamber, for removing residual ozone from said ozonated water stream and converting said ozonated water stream into an oxygen-rich and ozone-depleted water stream, wherein said ozone destruction unit comprises at least one broad-spectrum radiation source for providing UV radiation having wavelength ranging from about 170 nm to about 300 nm; and
  (c) a monitoring unit arranged to continuously monitor oxidation-reduction potential of said oxygen-rich and ozone-depleted water stream and to correlatively actuate said ozone supply to produce an output of ozone for maintaining said oxidation-reduction potential of said water stream at a predetermined level.

41. The water purification system of claim 40, wherein said predetermined level is in a range of from about 600 to about 1000 millivolts.

42. The water purification system of claim 40, wherein said predetermined level is in a range of from about 650 to about 950 millivolts.

43. The water purification system of claim 40, further comprising a water quality monitoring module, which continuously monitors one or more variables that are indicative of the quality of the water stream to be treated, compares such variables against a baseline value determined by previously observed values of such variables, identifies a significant deviation from such baseline value, and produces an output signal indicative of said deviation.

44. The water purification system of claim 43, wherein the variables that are monitored are selected from the group consisting of chlorine concentration, pH value, conductivity, total organic carbon (TOC), dissolved oxygen, chemical oxygen demand (COD), turbidity, and radioactivity.

45. A method for purifying a water stream, comprising the steps of:
(a) providing an ozonation unit comprising (i) an ozone contact chamber arranged to receive said water stream, mix said water stream with ozone, and discharge an ozonated water stream therefrom; and (ii) an ozone supply arranged for variable output of ozone and coupled in ozone-supplying relationship to said ozone contact chamber;
(b) flowing said water stream into the ozone contact chamber, mixing said water stream with ozone therein, and discharging the ozonated water stream therefrom;
(c) subsequently, passing said ozonated water stream through an ozone destruction unit, so as to remove residual ozone contained therein and to convert said ozonated water stream into an oxygen-rich and ozone-depleted water stream, wherein said ozone destruction unit comprises at least one broad-spectrum radiation source for providing UV radiation having wavelength ranging from about 170 nm to about 300 nm; and
(d) discharging the treated water stream.

46. A system for treatment of water to remove chemical, biological, and/or radiological contaminants therefrom, said system comprising a unitary sealed housing arranged for connection to an external water source and having an anti-tamper character, wherein said unitary sealed housing has disposed therein one or more water treatment units arranged to treat water from the external water source to produce a treated water stream depleted of chemical, biological, and/or radiological contaminants, and wherein said unitary sealed housing comprises an outlet for discharging said treated water stream therefrom.

47. The system of claim 46, wherein said anti-tamper character of the sealed unitary housing is provided by interiorly disposed explosive material that is denotatable by tamper activity breaching said sealed unitary housing.

48. The system of claim 46, wherein said anti-tamper character of said unitary sealed housing is provided by self-destruction of said housing and contents contained therein in case of tampering.

49. A system for the treatment of water to remove chemical, biological and/or radiological contaminants therefrom, said system comprising:
an ozonation unit for ozone treatment of said water, said ozonation unit comprising:
(i) an ozone contactor arranged to receive said water, contact said water with ozone therein, and discharge ozonated water therefrom; and
(ii) an ozone supply arranged for variable output of ozone and coupled in ozone-supplying relationship to said ozone contactor;
an ozone destruction unit coupled with the ozone contactor to receive ozonated water discharged therefrom, said ozone destruction unit being arranged to substantially completely remove ozone from said ozonated water and to discharge ozone-depleted water;
an activated carbon adsorber unit arranged to receive ozone-depleted water from the ozone destruction unit, contact the ozone-depleted water with activated carbon and discharge a treated water effluent; and
a monitoring unit arranged to monitor oxidation-reduction potential of said ozone-depleted water and to correlatively actuate said ozone supply to produce an output of ozone for maintaining said oxidation-reduction potential of said ozone-depleted water at a predetermined level.

50. The system of claim 49, wherein said ozone destruction unit comprises an actinic radiation source arranged to irradiate said ozonated water with radiation effective to destroy ozone therein.

51. The system of claim 50, wherein said radiation source has a broad irradiation spectral range of from about 170 nm to about 300 nm.

52. The system of claim 50, wherein said radiation of said radiation source includes ultraviolet radiation.

53. The system of claim 50, wherein said radiation of said radiation source comprises radiation with a wavelength of about 254 nm.

54. The system of claim 50, wherein said radiation of said radiation source comprises both radiation with a wavelength of about 185 nm and radiation with a wavelength of about 254 nm.

55. The system of claim 50, wherein said radiation of said radiation source comprises ultraviolet radiation effective to substantially completely remove chlorine, chloramines, and total organic carbon (TOC) content of said ozonated water.

56. The system of claim 50, wherein said radiation of said radiation source comprises ultraviolet radiation effective to gate $OH^-$ radicals in said ozonated water that are effective in degrading organic species that are present in said ozonated water.

57. The system of claim 50, wherein said radiation source produces radiation at an intensity in a range of from about 80,000 to about 500,000 microwatts per $cm^2$ of ozonated water surface.

58. The system of claim 50, wherein said radiation source produces radiation at an intensity in a range of from about 90,000 to about 450,000 microwatts per $cm^2$ of ozonated water surface.

59. The system of claim 49, wherein said ozone destruction unit comprises a first ultraviolet lamp producing radiation at a wavelength of about 254 nm and a second ultraviolet lamp producing radiation at a wavelength of about 185 nm.

60. The system of claim 49, wherein said activated carbon adsorber unit comprises a biological activated carbon adsorber unit.

61. The system of claim 49, wherein the ozone supply comprises an ozone generator and an air preparation unit arranged to purify air and feed purified air to the ozone generator for generation of ozone therein.

62. The system of claim 49, wherein the monitoring unit is arranged to monitor oxidation-reduction potential of said ozone-depleted water and to correlatively actuate said ozone supply to produce an output of ozone for maintaining said oxidation-reduction potential of said ozone-depleted water at said predetermined level at a substantially constant residence time of water in said ozone contactor.

63. The system of claim 49, further comprising flow circuitry arranged to recirculate ozone-depleted water from the ozone destruction unit to a point prior to said ozone contactor, or to discharge said water to waste.

64. The system of claim 49, further comprising a venturi injector coupled to the ozone supply and arranged to inject ozone from the ozone supply into the water.

65. The system of claim 49, further comprising an ultrafiltration unit arranged to ultrafilter said water prior to ozone treatment thereof in said ozone contactor.

66. The system of claim 65, further comprising an aeration unit arranged to aerate said water prior to ultrafiltering thereof in said ultrafiltration unit.

67. The system of claim 66, further comprising flow circuitry arranged to recirculate ozone-depleted water discharged from the ozone destruction unit, for recycle to the ultrafiltration unit or the aeration unit, or to discharge said water to waste.

68. The system of claim 49, further comprising an aeration unit arranged to aerate said water prior to ozone treatment thereof in said ozone contractor.

69. The system of claim 49, further comprising a baseline monitoring unit arranged to monitor oxidation-reduction potential of said water prior to ozone treatment thereof in said ozone contactor, thereby providing a baseline oxidation-reduction potential for calibration or computation involving oxidation-reduction potential of said ozone-depleted water as monitored by said monitoring unit arranged to monitor oxidation-reduction potential of said ozone-depleted water.

70. The system of claim 49, further comprising a radiological contaminant abatement unit arranged to receive treated water effluent from the activated carbon adsorber unit, remove radiological contaminant therefrom and discharge a further treated water effluent depleted in radiological contaminant.

71. The system of claim 70, wherein the radiological contaminant abatement unit comprises a nanofilter.

72. The system of claim 70, wherein the radiological contaminant abatement unit comprises a reverse osmosis unit.

73. The system of claim 70, wherein the radiological contaminant abatement unit comprises an ion exchanger.

74. The system of claim 49, further comprising an influent filter arranged to filter the water prior to ozonation thereof in the ozonation unit.

75. The system of claim 74, wherein the influent filter is arranged to remove material of size greater than about 10 micrometers from the water.

76. The system of claim 49, which in operation involves no chemical addition to water therein.

77. The system of claim 49, constructed and arranged as a mobile system.

78. The system of claim 49, constructed and arranged as a fixed position system.

79. The system of claim 78, as trailer-mounted for vehicular transport and deployment.

80. The system of claim 49, disposed in a unitary sealed housing having an anti-tamper character.

81. The system of claim 80, wherein said anti-tamper character of the sealed unitary housing is provided by interiorly disposed explosive material that is detonatable by tamper activity breaching said sealed unitary housing.

* * * * *